United States Patent [19]

Smith, Jr.

[11] 4,248,048
[45] Feb. 3, 1981

[54] ENGINE OPERATED BY A NON-POLLUTING RECYCLABLE FUEL

[75] Inventor: E. Quimby Smith, Jr., Camarillo, Calif.

[73] Assignee: Q Corporation, Troy, Mich.

[21] Appl. No.: 937,553

[22] Filed: Sep. 1, 1978

Related U.S. Application Data

[63] Continuation-in-part of Ser. No. 671,280, Mar. 29, 1976, Pat. No. 4,129,003.

[51] Int. Cl.³ ............................ F02G 1/00; F23B 7/00
[52] U.S. Cl. ........................................ 60/645; 60/517; 110/218; 110/344
[58] Field of Search .......... 60/643, 645, 670, 39.46 R, 60/39.46 S, 649, 673, 517, 682, 650, 270.5; 110/344; 431/99; 44/4

[56] References Cited

U.S. PATENT DOCUMENTS

| 2,616,252 | 11/1952 | Robinson | 60/39.46 S |
|---|---|---|---|
| 2,706,890 | 4/1955 | Schmidt | 60/649 |
| 2,744,742 | 5/1956 | Lord | 431/99 X |
| 2,777,288 | 1/1957 | Glinka | 60/39.46 S |
| 2,997,006 | 8/1961 | Grosse | 110/341 |
| 3,047,057 | 7/1962 | Carlyle | 1/99 X |
| 3,727,562 | 4/1973 | Bauer | 110/344 |
| 3,854,290 | 12/1974 | Asselman | 60/524 |
| 3,855,951 | 12/1974 | Giles | 110/216 |
| 3,863,452 | 2/1975 | Asselman | 60/524 |
| 3,911,284 | 10/1975 | Skala | 60/523 |

Primary Examiner—Allen M. Ostrager
Attorney, Agent, or Firm—Whittemore, Hulbert & Belknap

[57] ABSTRACT

A system of operating an engine on a recyclable, relatively non-polluting fuel. The fuel may include any one or more of the following: magnesium (Mg), aluminum (Al), magnesium plus aluminum, magnesium-aluminum alloy, magnesium hydride ($MgH_2$) aluminum hydride ($AlH_3$) and magnesium aluminum hydride ($Mg(AlH_4)_2$). The fuel when burned produces oxides and hydroxides of magnesium and/or aluminum. The oxides and hydroxides can be reduced to magnesium and/or aluminum and/or their hydrides and reformed for reuse in the engine. The system is intended for use not only in automotive engines but also stationary power plants including refrigeration.

17 Claims, 3 Drawing Figures

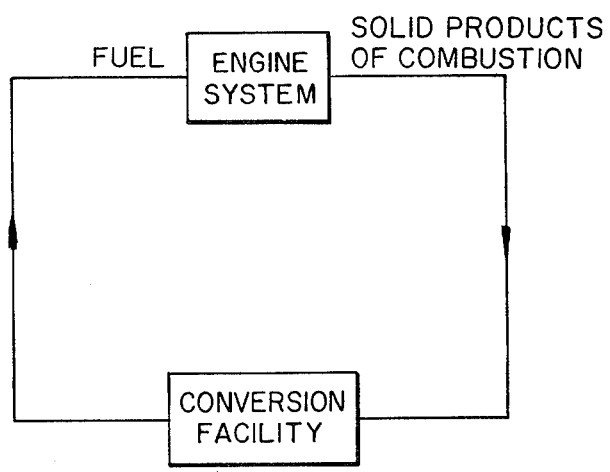
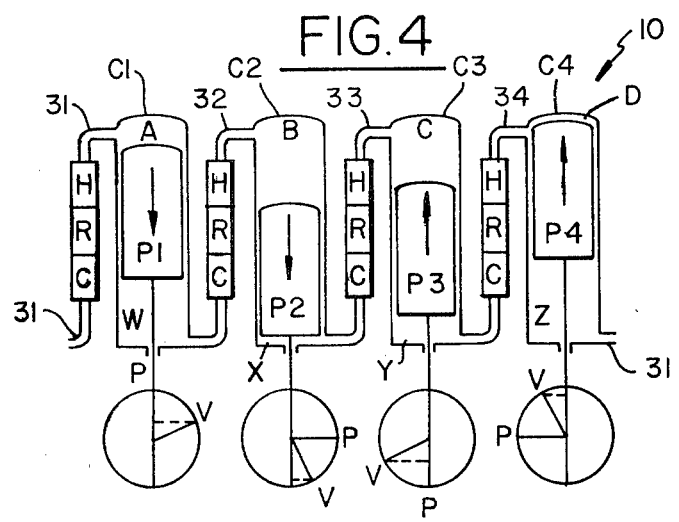
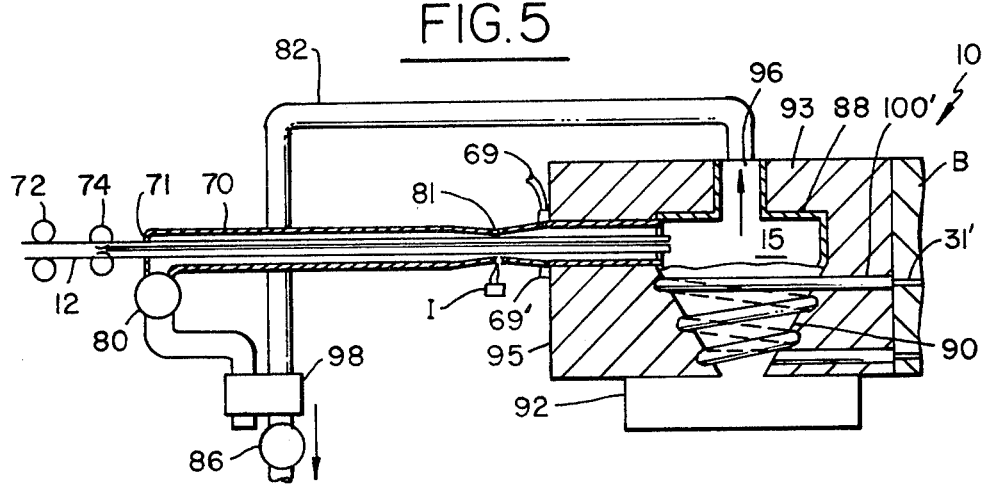

ENGINE OPERATED BY A NON-POLLUTING RECYCLABLE FUEL

REFERENCE TO RELATED APPLICATION

This application is a continuation-in-part of my co-pending application Ser. No. 671,280, filed Mar. 29, 1976, now U.S. Pat. No. 4,129,003.

BACKGROUND AND SUMMARY OF THE INVENTION

Motor vehicle engines in present use almost without exception operate on petroleum or gasoline which is made from petroleum.

There are two main objections to these engines. One is that the fuel they use is non-recyclable and at the present rate of consumption, the world's petroleum reserves may soon be gone. A second objection is that the products of fuel combustion when exhausted to the atmosphere are a major cause of air pollution.

It is among the objects of this invention to provide a system of operating an engine which utilizes a relatively non-polluting, recyclable fuel. The fuel is selected from the group consisting of magnesium, aluminum, magnesium plus aluminum, magnesium-aluminum alloy, magnesium hydride, aluminum hydride and magnesium aluminum hydride. A fuel could, for example, be made up of a compressed or sintered mass of particles of some or all of the materials comprising the above group. The solid products of combustion would be aluminum oxide ($Al_2O_3$), magnesium oxide (MgO), magnesium hydroxide ($Mg(OH)_2$) and aluminum hydroxide ($Al(OH)_3$). These oxides and hydroxides can be collected and reduced to magnesium and aluminum and reformed for reuse as a fuel or for other end uses such, for example, as the manufacture of containers or cans for food and other products. The fuel is relatively non-polluting since after the oxides and hydroxides are collected there is substantially nothing but air to be exhausted to the atmosphere.

Other objects include utilizing the products of combustion to preheat the air used to burn the fuel; providing a separator to collect the solid portion of the products of combustion for recycling; making use of the separator as the combustion chamber for the fuel; and using a heat transfer means such as a sodium or other heat pipe in such a manner as to heat the working fluid of the engine by the fuel indirectly through the heat pipe. Of course, the working fluid can also be heated directly without using a heat transfer means.

Other objects and features of the invention will become more apparent as this description proceeds, especially when taken in conjunction with the accompanying drawings wherein:

FIG. 1 is a diagram illustrating the system of my invention including recycling of the fuel in a conversion facility after use in the engine.

FIG. 4 is a diagrammatic view showing the cylinders of the engine and the channels for the working fluid.

FIG. 5 is similar to a portion of FIG. 2 but shows a modification.

Figure 3:
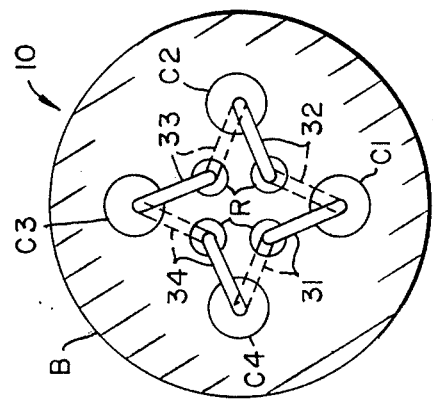
FIG. 3 is a view taken substantially on the line 3—3 in FIG. 2.

Referring now more particularly to the drawings and especially to FIG. 1, the system of my invention involves the operation of an engine such as a Stirling engine on a fuel which is selected from the group consisting of magnesium, aluminum, magnesium plus aluminum, magnesium-aluminum alloy, magnesium hydride, aluminum hydride and magnesium aluminum hydride. In other words, the fuel may include any one or more of the materials in the group. Let it be assumed that the fuel contains magnesium and aluminum, whether alloyed or not, as well as hydrides thereof. The solid products of combustion, namely, magnesium oxide (MgO), aluminum oxide ($Al_2O_3$), magnesium hydroxide ($Mg(OH)_2$) and aluminum hydroxide ($Al(OH)_3$), resulting from the operation of the engine are collected. They are then taken to a conversion facility for recycling. Any suitable power station, such for example as a nuclear or hydro-electric power station or one operated by coal or oil may be used to operate the conversion facility. At the conversion facility, the oxides and hydroxides of magnesium and aluminum are reduced to magnesium and aluminum and their hydrides which are thereafter reformed to produce fuel that may again be used to operate the engine. If desired, some of the recycled magnesium and aluminum may be used for the manufacture of other products such as containers or cans which may thereafter be collected and recycled as fuel.

The production of magnesium can be accomplished by any suitable process as for example by the thermal reduction of magnesium oxide using ferrosilicon. It has also been done by thermal reduction of magnesium oxide with silicon. For a more complete description of these processes, which are well known, reference is made to "Magnesium and Magnesium Alloys" in Kirk-Othmer Encyclopedia of Chemical Technology, 2nd ed., New York, London, Sydney, Toronto, Interscience Publishers Division of John Wiley and Sons, Inc., 1967, Vol. 12, pp. 661–708. Other processes may be used.

The production of aluminum can be accomplished by any suitable process as for example by decomposing alumina ($Al_2O_3$) by means of a continuous electric current which flows through an electrolytic cell containing alumina dissolved in cryolite. The aluminum is deposited at the cathode. The operation is carried out at a temperature of 940° C. to 980° C. For a more complete description of the process, which is well known, reference is made to "Aluminum and Aluminum Alloys" in Kirk-Othmer Encyclopedia of Chemical Technology, 2nd ed. New York, London, Interscience Publishers Division of John Wiley and Sons, Inc., 1963, Vol. 1, pp. 929–989. Other processes may be used.

The production of magnesium hydride ($MgH_2$) can be accomplished by any suitable means. Since hydrogen is soluble in magnesium, production may be carried out by bubbling hydrogen through magnesium in powder or molten form at elevated temperature and pressure, for example 470° C. and 50 atmospheres pressure. The amount of magnesium hydride formed will depend upon the length of time the process is continued. The ratio of pure magnesium to magnesium hydride thus can be controlled by varying the time. Other processes may be used.

The production of aluminum hydride (AlH$_3$) can be accomplished by any suitable means. Since hydrogen is also soluble in aluminum, production can be accomplished by bubbling hydrogen through aluminum in powder or molten form at elevated temperature and pressure. Again, the ratio of pure aluminum to aluminum hydride will depend on the length of time the process is continued. AlH$_3$ can also be formed by the following chemical reaction: AlCl$_3$+3LiH $\xrightarrow{Et_2O}$ AlH$_3$+3LiCl. Other processes may be used.

The production of magnesium aluminum hydride (Mg(AlH$_4$)$_2$) can be by any suitable means as by bubbling hydrogen through a magnesium aluminum alloy in powder or molten form at elevated temperature and pressure, the ratio of magnesium aluminum alloy to magnesium aluminum hydride in the final mix depending upon time. Other processes may be used.

Figure 2:
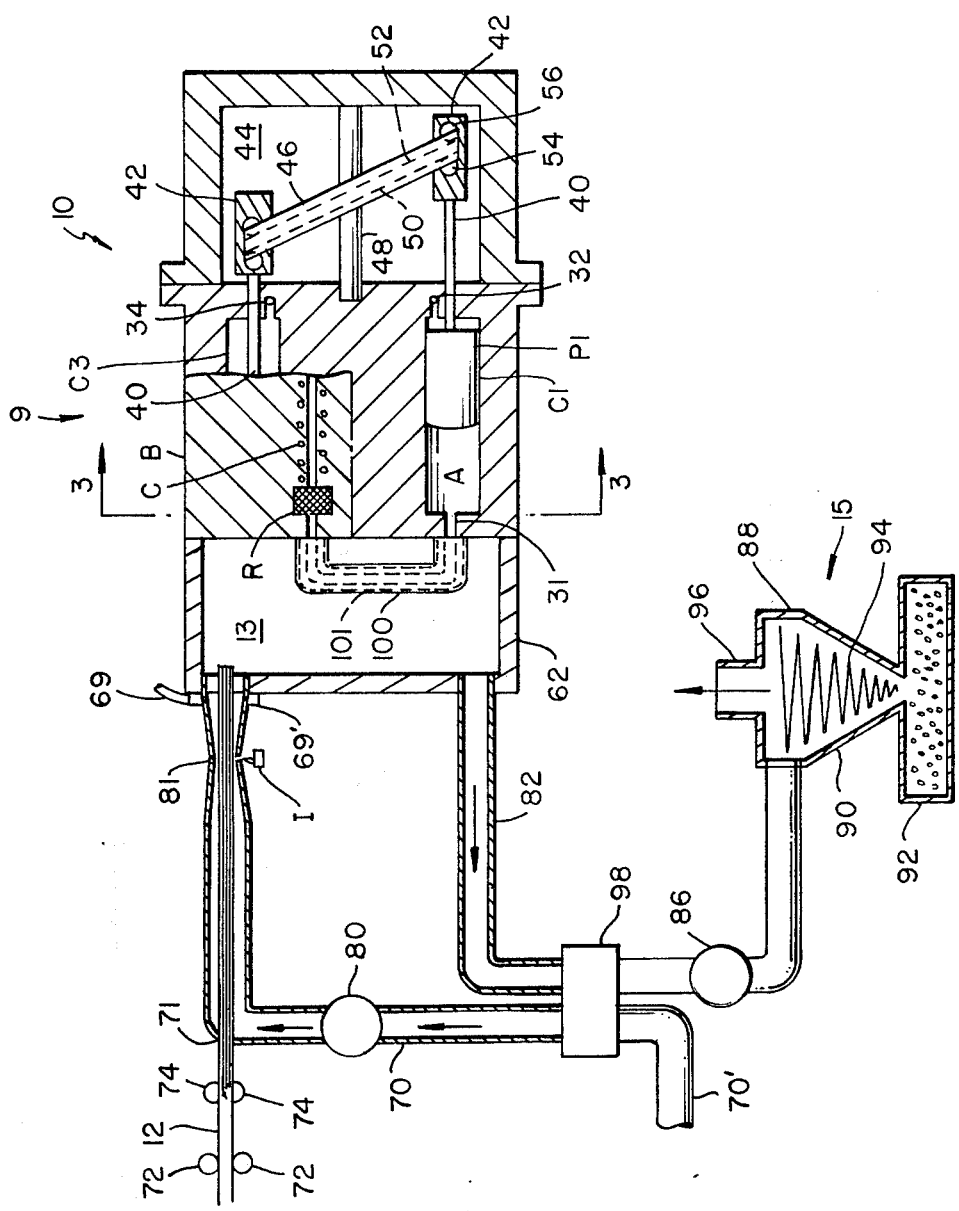
FIG. 2 is a semi-diagrammatic view of a Stirling type engine operated by the system of my invention.

Referring now to FIGS. 2 and 3, there is shown diagrammatically an engine system including a Stirling engine 10. Means are provided for feeding fuel rods 12 to a combustion chamber 13 to supply the heat necessary to operate the engine. A separator 15 is also shown for separating the solid residue from the products of combustion.

The engine 10 is only illustrative of one type of engine that may be employed. Stirling engines of other designs may be used as well as engines operating on the Rankine and Brayton cycles. All such engines can be external combustion engines and must be for the purposes of this invention. All Stirling engines operate on a closed regenerative thermodynamic cycle and Rankine and Brayton engines operate on both closed and open regenerative thermodynamic cycles.

It should be pointed out that the combusted products of the burned fuel, namely, the oxides and hydroxides of aluminum and magnesium, are solids and are abrasive and therefore not suitable for use in an internal combustion engine. For that reason this fuel is used with external combustion engines.

The engine 10 as stated is a Stirling type engine. It is a four-cylinder, double-acting swash plate design and is selected for purposes of illustration. Other designs, including those of the single-acting type are also contemplated. In line, V-type and other configurations are possible and may make desirable the use of multiple combustion chambers and separators as well as multiple combined combustion chamber-separators such as shown in FIG. 5. The drive instead of being a swash plate drive could be a rhombic, riana or other drive. The engine 10 has four cylinders C1–C4 arranged in a circle in equal angularly spaced relation in the cylinder block B to give an exact 90° phase shift between the piston movements in each cylinder. The pistons P1–P4 reciprocate in the cylinders.

The diagram of FIG. 4 shows the four cylinders and the working channels connecting the cylinders and is helpful in understanding the operation of the engine. Each of the expansion spaces A, B, C and D is connected by one of the working channels or conduits 31–34 to the compression space at the bottom of the next cylinder. The compression spaces are designated W, X, Y and Z. Sometimes in Stirling terminology the expansion spaces are referred to as the hot spaces and the compression spaces are referred to as the cold spaces. Thus channel 31 extends from the expansion space A at the top of cylinder C1 to the compression space Z at the bottom of cylinder C4. Channel 32 extends from the expansion space B at the top of cylinder C2 to the compression space W at the bottom of cylinder C1, etc. Each of these channels passes through a heater H, regenerator R and cooler C. The regenerator may be a matrix of finely divided metal in the form of wires or strips and may be thought of as a thermodynamic sponge, alternately absorbing and releasing heat.

The engine 10 selected for purposes of illustration is a double-acting swash-plate design with any suitable fluid such as air, hydrogen or helium as the working fluid in the expansion and compression spaces and connecting channels. Being double-acting, there will be an effective pressure variation on both sides of each piston. The thermodynamic design of this engine has been calculated such that it has an optimum pressure phase of 63°, which means that at a crank angle of 63° after the piston has been in its top dead-center position, the pressure will reach its maximum value. The axial (i.e. dotted) projection of point V in the circles beneath each of the cylinders in FIG. 4 indicates the piston position of each cylinder, and the axial projection of point P gives the cylinder pressure above the piston.

In this suggested design, the piston P1 in FIG. 4 has traveled 63° in crank angle after the piston has been at top dead center. Pressure on the top of the piston P1, in accordance with the thermodynamic design calculated for this engine, will be 207 atmospheres and pressure on the bottom 150 atmospheres. Piston P2 still moving downward, has 150 atmospheres on the top and 106 atmospheres on the bottom. Piston P3, moving upward, has 106 atmospheres on the top and 150 atmospheres on the bottom. Piston P4 moving up, has 150 atmospheres on the top and 207 atmospheres on the bottom. Because of these differential pressures, each piston produces work nearly continuously. In this proposed Stirling engine design, the expansion spaces operate at a high temperature (1,674° Rankine) and the compression spaces operate at a relatively low temperature (629° Rankine). The temperatures and pressures hereinabove referred to are calculated, theoretical temperatures and pressures. The theoretical and practical aspects of this engine are set forth in the textbook "Stirling Cycle Engines" by Dr. G. Walker, Oxford, Clarendon Press, 1973.

Referring back to FIG. 2, the piston rod 40 for each piston has a coupler 42 in the chamber 44 of the engine. The swash-plate 46 rotates in chamber 44 on the shaft 48 and has circular grooves or tracks 50 and 52 in the top and bottom surfaces engaged by rollers 54 and 56 carried by the couplers to cause the swash-plate to rotate as the pistons move up and down.

• The channel or conduit connecting the expansion space A at the top of cylinder C1 to the compression space Z at the bottom of cylinder C4 is designated 31. As shown in FIG. 2, this conduit extends into the combustion chamber 13 within housing 62, (which combustion chamber constitutes the heater H diagrammatically shown in FIG. 4), and then extends back into the cylinder block B, passing through the regenerator R and the cooler C to the compression space. The other channels 32–34 likewise pass through the combustion chamber 13, regenerator R and cooler C on the way to the compression space of the next cylinder.

Air and fuel are delivered or conveyed to the combustion chamber 13 where the fuel is burned. The burning of the fuel produces the high temperature necessary to heat the working fluid in the expansion spaces of the cylinders to drive the engine. The fuel may be of many forms and may consist of rods of a magnesium-aluminum alloy. The amounts of magnesium and aluminum in the alloy may be anything within the full range of proportions that can be effectively alloyed. A suggested or desirable magnesium to aluminum ratio in the alloy is 35% by weight magnesium and 65% by weight aluminum. Rods of pure aluminum or pure magnesium or magnesium plus aluminum are also contemplated as fuels to be burned in the combustion chamber. Magnesium plus aluminum rods may be formed of compressed or sintered particles of magnesium and aluminum. If these two metals are combined in the fuel, it is preferred that they be alloyed but the metals if desired may be used separately or together without being alloyed. Combining magnesium and aluminum is desirable and makes a preferred fuel for the reason that the aluminum provides the necessary heat to operate the engine and the magnesium, while also supplying heat, has the ability to ignite readily and in turn to ignite the aluminum.

As previously stated, the fuel may include any one or more of the following: magnesium, aluminum, magnesium plus aluminum, magnesium-aluminum alloy, magnesium hydride, aluminum hydride and magnesium aluminum hydride. The hydrides are advantageous and make a preferred fuel because they produce more heat when burned than magnesium or aluminum alone. However, the reaction of the hydrides in the presence of water can be hazardous. A given fuel may contain all of the material within the group specified in varying amounts depending upon particular requirements, or any one or more of such materials. Thus a fuel may, for example, contain both magnesium and aluminum, whether alloyed or not, with or without one or more of the hydrides added to increase the heat output.

The chemical reaction when pure magnesium is burned is: $Mg + \frac{1}{2}O_2 \rightarrow MgO$ with an enthalpy change or heat release of $-143.84$ kcal/gm mol. For aluminum the reaction is: $2Al_2 + 3/2O_2 \rightarrow Al_2O_3$ with a heat release of $-399.09$ kcal/gm mol.

The burning of a fuel containing magnesium and/or aluminum can be accelerated by water, as hereinafter more fully described in connection with certain of the drawings. If water is added in the combustion of magnesium, the reaction would be: $Mg + H_2O + \frac{1}{2}O_2 \rightarrow Mg(OH)_2$ with a heat release of $-152$ kcal/gm mol. This represents an increase in the amount of heat released when magnesium is burned in the presence of water over that in which water is not present. A similar increase of heat released occurs when aluminum is burned in the presence of water although only a relatively small amount of aluminum hydroxide ($Al(OH)_3$) may be expected from the reaction since the aluminum combines more readily to produce aluminum oxide ($Al_2O_3$).

If magnesium hydride ($MgH_2$) is combusted, the reaction is as follows: $MgH_2 + O_2 \rightarrow MgO + H_2O$ with a heat release or enthalpy change of $-183.4$ kcal/gm mol. Thus combustion of $MgH_2$ with oxygen will yield a substantially greater heat release than will pure magnesium.

It is known that $MgH_2$ reacts vigorously with water. The reaction is: $MgH_2 + 2H_2O \rightarrow Mg(OH)_2 + 2H_2$ and the heat release is $-67$ kcal/gm mol. A subsequent reaction of $H_2$ with oxygen will yield a total heat release of $-182.66$ kcal/gm mol. which is very near the heat release of $MgH_2$ with oxygen.

The following reaction is also possible when $MgH_2$ is combusted: $MgH_2 + O_2 \rightarrow Mg(OH)_2$ yielding $-202.8$ kcal/gm mol. This represents a substantial increase over pure magnesium in the amount of heat released.

When aluminum hydride ($AlH_3$) is combusted, the following reaction occurs: $2AlH_3 + 3O_2 \rightarrow Al_2O_3 + 3H_2O$ with a heat release of $-550.5$ kcal/gm mol., representing a substantial improvement over the combustion of pure aluminum.

The foregoing chemical reactions show that the combusting of $MgH_2$ produces a greater heat release than pure Mg. The same comparison has been shown for $AlH_3$ and pure Al. There is a similar improvement in heat release of $Mg(AlH_4)_2$ over Mg and Al whether mixed or alloyed.

Continuing with a description of FIG. 2, one or more fuel rods 12 are fed into the combustion chamber through the conduit 70 by suitable means such as feed rolls 72 driven in any suitable manner and preferably at a speed related to the thermal demand of the engine. If desired, the fuel rod may be split longitudinally as it is fed into the combustion chamber to provide two or more strips of the metal alloy in smaller sections which will burn more rapidly. Slitters which may be knives in the form of axially rotatable discs are indicated diagrammatically at 74.

It is also contemplated that the fuel rods may be braided or of any other configuration considered desirable or suitable depending upon the burning rate and heat requirements of the engine. The use of slitters to form the fuel rods into strips as they enter the combustion chamber is merely indicative of one way in which the rods may be treated to alter their burning rate. Alteration of the burn rate may require a change in the speed at which the rod is fed in order to maintain the flame front in the proper location. Another way to vary heat released would be to increase the number of rods fed into the combustion chamber, as will be described more fully hereinafter.

Figure 9:
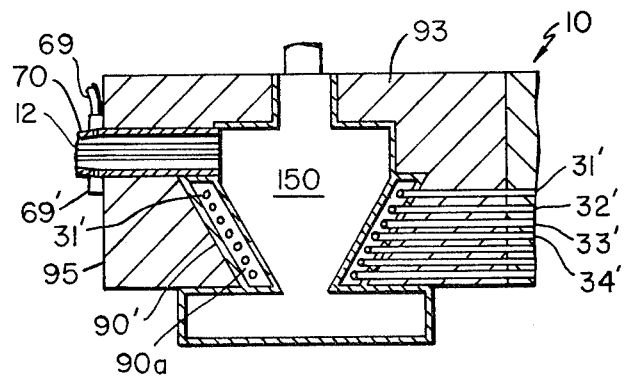
FIG. 9 shows a modification of a portion of the structure in FIG. 5, that portion of the structure not shown being the same as in FIG. 5.

The conduit 70 through which the fuel rods are fed into the combustion chamber is an air conduit by means of which air is admitted into the combustion chamber to burn the fuel. Sealed holes 71 in the conduit admit the rods. A blower may be provided for drawing air in through inlet 70' and forcing the air into the combustion chamber. Blower 80 is employed for this purpose and is shown in this instance as being located in the conduit 70. The conduit 70 preferably has a venturi restriction 81 where an igniter I shown diagrammatically in the form of a propane or butane flame, for example, is provided to ignite the fuel through an orifice in the conduit so that to the right of the igniter I the fuel is burning and continues to burn as it enters the combustion chamber. Instead of a flame type ignition, a spark ignition may be used in which case the venturi restriction would serve no purpose and would be eliminated. The ignition by either spark or flame could be located either in the conduit 70 or the combustion chamber 13. In the embodiments of FIGS. 5 and 9, described more fully hereinafter, the ignition by spark or flame could be located either in the conduit 70 or the combustion chamber-separator 15 or 150.

Water from pipe 69 may be introduced into conduit 70 through spray ring 69' beyond the point of ignition to spray water on the burning fuel rods just prior to their entry into the combustion chamber. Actually, the water could be sprayed on the fuel rods after they enter the combustion chamber. The water increases the burn rate of the fuel and produces more heat. The solid part of the products of combustion when water is used will include magnesium hydroxide (perhaps also a very small amount of aluminum hydroxide) which can be reduced to magnesium or aluminum in accordance with known procedures referred to above.

FIG. 2 shows that portion of channel 31 within the combustion chamber as extending through a heat pipe 100. The heat pipe is used to indirectly heat the working fluid in the channel to a sufficient temperature to operate the engine. The heat pipe 100 is a sodium heat pipe which is preferred because it is capable of transferring large amounts of heat from a large surface to a small surface with a very small difference in temperature. Other heat transfer means including heat pipes other than sodium heat pipes may be employed. The sodium heat pipe 100 consists of a hermetically sealed chamber filled with sodium and completely embracing that portion of the channel 31 within the combustion chamber. The inner surface of the heat pipe is provided with a lining 101 of porous material in which liquid, in this case liquid sodium, can be absorbed and transported by means of capillary forces.

The sodium vaporizes due to the heat in the combustion chamber. The sodium vapors then condense on the surface of the relatively cooler conduit 31. During condensation heat is given up condensing the sodium which then flows back under the action of capillary forces in the porous lining to the relatively warmer surface of the heat pipe. The dotted lines just inside the surface of the heat pipe indicate the porous lining.

It will be understood that the portions of the other channels 32-34 disposed in the combustion chamber may also extend through a sodium heat pipe similar to heat pipe 100. Also, two or more of the channels 31-34 may extend through a common heat pipe.

A conduit 82 from the combustion chamber leads to a separator 15 the purpose of which is to separate the solids [MgO and $Al_2O_3$ (and $Mg(OH)_2$ and $(Al(OH)_3)$ if water or hydrides are used as an accelerator)] from the products of combustion withdrawn from the combustion chamber and to release or exhaust the gaseous products of combustion to the atmosphere. Although not required in most instances, a blower 86 may be provided in the conduit 82 to draw the products of combustion from the combustion chamber and to force them into the separator 15.

The separator 15 can be of various types but in this instance is shown as a vortex separator in the form of a housing having a circular top section 88, a conical intermediate section 90 and a receptacle 92 at the bottom. The gaseous and solid products of combustion enter the separator peripherally in the circular section 88 and are caused to rotate rapidly therein. The zigzag line 94 in the separator diagrammatically illustrates the helical path of the solid particles of combustion as they drop to the bottom of the separator to be collected in the receptacle 92. An opening, adapted to be covered by a suitable closure, may be provided in the receptacle for the removal of the solids. The gaseous portion of the products of combustion are exhausted to the atmosphere through the center outlet at the top indicated at 96. The exhaust is substantially only air and hence non-polluting.

The density of the solids (MgO, $Al_2O_3$ and $Mg(OH)_2$) relative to air is high and so a centrifuge process using a vortex separator is recommended. The commercial dust collector described in "Brochure for American Standard Industrial Products Department, Series 322, Dust Collector, Catalog F-1201" is of a size, weight and airflow suitable for the purposes of this invention as a solids collector but can be scaled up or down in size. The goal of zero pollutants and complete recycling may require that an electrostatic precipitator or other type of solids collector be used in place of or in series with the vortex separator in that MgO, $Al_2O_3$ and $Mg(OH)_2$ are diamagnetic.

It will be noted that the incoming air in conduit 70 and the outgoing products of combustion in the conduit 82 pass through a preheat exchanger 98 so that the incoming air is preheated by the hot products of combustion. All elements including the combustion chamber, conduits and the preheat exchanger in hot gas or particle flow are thermally insulated in accordance with good design procedures.

In use, the fuel rod or rods 12 are fed through the conduit 70 by the feed rollers 72 at the same time that the blower 80 forces air into the conduit. The rate at which the fuel rod or rods are advanced and their size will depend upon the power demands of the engine. The fuel is ignited by the igniter I and burns in the combustion chamber 13 to raise the temperature therein sufficiently to heat the working fluid in the expansion spaces of the cylinders to drive the engine. As stated previously, the working fluid is preferably heated indirectly through the sodium heat pipes which surround the working channels although other heat transfer means as well as direct heat may be employed.

The solid and gaseous products of combustion are withdrawn from the combustion chamber and forced into the vortex separator 15. The hot products of combustion withdrawn through conduit 82 preheat the incoming air in conduit 70 by means of the preheat exchanger 98.

The solid products of combustion are collected in the receptacle 92 at the bottom of the separator. The gaseous portion of the products of combustion, substantially only pure air, are exhausted to the atmosphere through the opening 96.

The solid products of combustion in the receptacle 92, assuming the fuel contains magnesium and aluminum, whether alloyed or not, and/or the hydrides thereof referred to above, will comprise magnesium oxide (MgO) and aluminum oxide or alumina ($Al_2O_3$) and in addition magnesium hydroxide ($Mg(OH)_2$) and perhaps some aluminum hydroxide ($Al(OH)_3$). These solids are transferred to a conversion station where they are reduced to the elements magnesium and aluminum in accordance with known procedures referred to hereinabove.

The magnesium and aluminum are then again alloyed and/or hydrided and formed into rods or into any other desired or suitable configuration for reuse as a fuel in the engine or other consumer products.

The recycled fuel is capable of being used over and over again. The gases exhausted to the atmosphere are substantially non-polluting.

FIG. 5 illustrates a modification of the invention in which the vortex separator 15 serves also as the combustion chamber and therefore may be referred to appropriately as a combustion chamber-separator. Parts corresponding to those described in FIGS. 2 and 3 are identified by the same reference numerals and it will be noted that the burning fuel in the conduit 70 enters directly into the combustion chamber-separator at the point where in FIG. 2 the exhaust products of combustion enter the separator. Water may be sprayed on the burning fuel by means of conduit 69 having a spray ring 69' opening into conduit 70 beyond the point of ignition. The burning fuel heats the chamber within the separator which as stated becomes now the combustion chamber, and the solid products of combustion (MgO and $Al_2O_3$ and including $Mg(OH)_2$ if water or hydrides are used) follow a helical path to the receptacle 92 at the bottom of the combustion chamber-separator 15 while the gaseous products of combustion leave the combustion chamber-separator through the exhaust outlet 96 at the top. The combustion chamber-separator 15 will be seen to be encased in a suitable high temperature material such as carbon graphite 93 which is strong and has good thermal conductivity properties to transmit the heat from the combustion chamber-separator to the heat pipe 100', more fully described hereinafter. Other materials having similar characteristics may also be used. A suitable heat insulating material 95 covers the carbon graphite encasement.

The hot gaseous portion only of the products of combustion is withdrawn through conduit 82 by blower 86, passing through the preheat exchanger 98 before being exhausted to the atmosphere. The solids have been separated out to prevent clogging and fouling of the heat exchanger.

The sodium heat pipe 100' will be seen to have a section coiled helically about the conical portion of the combustion chamber-separator to be heated thereby. The channel 31' for the working fluid in the engine extends within the heat pipe 100' as in the previous embodiments to be indirectly heated by the heat pipe. the heat pipe 100' is similar in construction and function to the one previously described except that it extends helically about the combustion chamber-separator. The heat of the combustion chamber-separator is transmitted to the heat pipe 100' by the encasing material 93 over substantially the full circumference of the pipe. Of course, the other channels, not shown, also extend within similar heat pipes likewise wrapped helically about the combustion chamber-separator. As in the previous embodiments, two or more channels may be disposed in the same heat pipe.

The operation of this modification is substantially the same as that previously described, the fuel being recycled from the collected oxides and the relatively non-polluting gas exhausted to the atmosphere.

Figure 6:
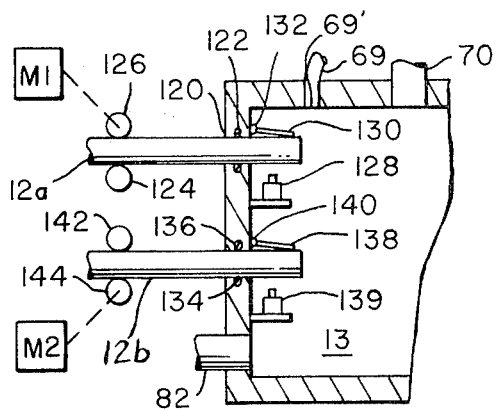
FIG. 6 is a fragmentary sectional view illustrating a further modification.

FIG. 6 shows a modification of the apparatus of FIG. 2 in which plural fuel rods 12a and 12b are employed and in which a spark ignition is provided. Obviously, a flame ignition of the type previously described could be employed. The fuel rods may be of the same composition as previously described.

Fuel rod 12a is fed through an opening 120 in the combustion chamber 13 sealed as by means of an O-ring 122. The feed rollers for advancing the fuel rod 12a include the idler 124 and the roller 126 driven by motor M1. A spark plug 128 is located adjacent to the fuel rod 12a just inside the combustion chamber. A flap 130 hinged at 132 is normally spring urged to closed position in which it covers the opening 120 in the combustion chamber wall but can be forced open by the advancing fuel rod. The spark plug 128 may be operated by a suitable means such as an electric switch in response to the opening of the flap 130 to ignite the fuel.

The fuel rod 12b projects through the opening 134 in the wall of the combustion chamber 13 which opening is sealed as by the O-ring 136. A similar flap 138 hinged at 140 normally closes the opening 134 in the combustion chamber wall, being urged to closed position by spring pressure, but is forced open by the advance of the fuel rod 12b. The feed rollers for rod 12b include the idler 142 and the roller 144 driven by motor M2. The spark plug 139 for igniting the rod 12b is located adjacent to the fuel rod 12b inside the combustion chamber 13 and may be operated like spark plug 128 in response to opening of flap 138. While only two rods are shown, the configuration can be expanded to include as many rods as are necessary for full engine demand. Multiple rods could also be fed into the conduit 70 in FIG. 2, if desired.

Air is admitted to the combustion chamber 13 through the conduit 70 which is like the conduit 70 previously described, although without the venturi. Also, it enters the combustion chamber 13 at a different point. The products of combustion are removed from the combustion chamber 13 by the conduit 82 as in the previously described embodiments.

One of the purposes of the FIG. 6 construction is to illustrate a means of operating the engine under varying power demands. It may be assumed that the rod 12a, during engine operation, is fed into the combustion chamber 13 at idling speed by motor M1. When it is desired to accelerate the engine, that is when there is an increased power demand, operation of the engine accelerator will energize motor M2 to feed the second rod 12b into the combustion chamber. The spark plug 139 for the rod 12b will operate in response to opening of the flap 138 to ignite the rod 12b and supply the required additional Btu's. It will be understood that additional supplementary fuel rods and related igniting and driving apparatus may be provided when the accelerator is further depressed for heavy power demands.

Should it be desired to return the engine to idling speed, or lower power, the motor M2 will be deenergized when the accelerator is released. The portion of the solid fuel rod 12b projecting into the combustion chamber 13 will burn back to the wall of the chamber whereupon the flap 138 will close to extinguish the rod.

In the foregoing embodiments, the fuel has been shown as being in the form of rods. Other solid forms have been described. However, it is possible that the fuel may take the form of a mixture of particles which can be pumped into the combustion chamber. A slurry may be formed of small pellets or particles of any selection of the fuel components referred to heretofore in a liquid. The liquid should be non-oxygen-containing and may for example consist of kerosene or oil. While these volatile liquids are themselves polluting to the atmosphere, they would comprise a small portion of the total slurry and would be present primarily for their ability to serve as a carrier or medium for the fuel pellets and provide a slurry-type of mixture. The particle mixture could also be dry, that is, without a liquid medium.

Figure 7:
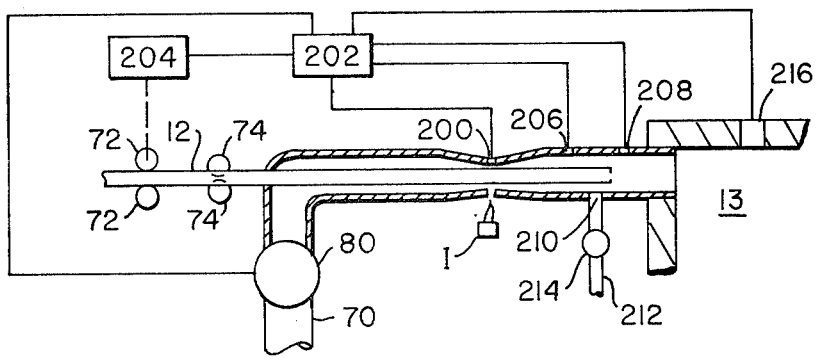
FIG. 7 shows a modification of a portion of the structure of FIG. 2, the remaining structure being the same as in FIG. 2.

FIG. 7 shows a modification of a portion of the structure of FIG. 2, the remaining structure being the same as in FIG. 2.

As shown in FIG. 7, a photocell 200 is provided at the point of ignition which senses ignition of the tip of the fuel rod 12 and sends a pulse signal to the servo-computer 202 which actuates the drive motor 204 for one of the feed rolls 72, the other feed roll being an idler, to feed the rod 12 forward or to the right at a speed greater than the fuel burning rate, thus advancing the flame front on the tip of the rod past photocell 206 located further down stream along the conduit 70. Photocell 206 senses the passage of the flame front and sends a signal to the servo-computer 202 to decrease the speed of drive motor 204 to slow down the advance of the rod but still to maintain a speed of advance slightly greater than the burning rate. The flame front continues to advance to the photocell 208 further downstream which senses the same and sends a pulse signal to the servo-computer 202 which causes the drive motor 204 to further reduce its speed and accordingly reduce the speed of advance of the fuel rod 12 to a speed slightly less than or equal to the burn rate. The burning tip will thus be maintained between the two photocells 206 and 208 through signals transmitted through the servo-computer 202 to the drive motor to adjust the speed thereof.

A water spray is also provided in FIG. 7 to accelerate the burning of the fuel and thus meet heavier load demands. The water spray is introduced into the conduit 70 between the photocells 206 and 208 at the point where the flame front is maintained by a spray injector 210 fed by a water pipe 212 having a normally closed valve 214 in the water pipe. When accelerated burning is desired as when the throttle or accelerator of the engine is depressed, a connection from the throttle or accelerator to the valve 214 opens the valve to spray water onto the burning fuel.

A heat sensor 216 which may be a thermocouple is provided in the combustion chamber to guard against excessive temperatures. When a dangerously high temperature in the combustion chamber is reached the heat sensor 216 sends a signal to the servo-computer 202 to increase the speed of blower 80 to drive more air through the pipe 70 into the combustion chamber in an amount substantially exceeding that required for the purposes of combustion to absorb heat and thus lower the operating temperature within the combustion chamber. The heat sensor 216 could also be used to sense variations in temperature and alter the burn rate as, for example, by appropriate signal to the servo-computer to engage or disengage the slitters or open or close the water valve or feed more or fewer fuel rods to the combustion chamber.

Suitable wiring from the photocells 200, 206 and 208 and heat sensor 216 to the servo-computer 202 and from the latter to the drive motor 204, blower 80 and water valve 214 are provided as shown.

Figure 8:
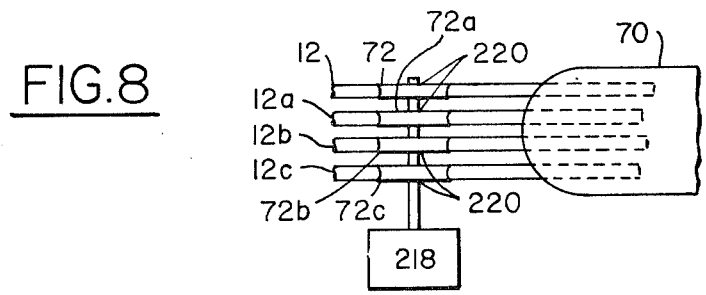
FIG. 8 shows a further modification of FIG. 2.

FIG. 8 shows a further modification of a portion of the structure of FIG. 2, the remainder of the FIG. 2 structure being the same. As there shown, multiple fuel rods 12, 12a, 12b and 12c of the same construction as previously described, are fed into the conduit 70 by drive motor 218. Pairs of feed rollers for rods 12, 12a, 12b and 12c are provided, the ones shown being indicated at 72, 72a, 72b and 72c and being connected to the output shaft of the drive motor 218, in this case by magnetic clutches 220, the others being idlers. FIG. 8 shows another method of meeting increased engine demands which does not rely upon the use of water. In FIG. 8 the clutch 220 for the feed roller 72 will always be engaged by an electrical contact when the motor 218 is operated to furnish minimum power at idling speed. When the throttle or accelerator is depressed to call for more power output this will close an electrical contact to actuate the magnetic clutch 220 for the feed roller 72a of the second rod 12a to feed the second rod to the flame front area. Further depression of the accelerator will in the same manner engage successively the clutches of the feed rollers of the rods 72b and 72c. The tips of the rods 12a-12c will be ignited by the burning tip of rod 12 when they reach the flame front thereof or by other means.

FIG. 9 shows a modification of a portion of the structure in FIG. 5, that portion of the structure not shown being the same as in FIG. 5.

FIG. 9 differs from FIG. 5 in the manner in which the channels 31'-34' are indirectly heated by the heat of the burning fuel in the combustion chamber-separator through the heat transfer means which in this case is a heat pipe, preferably a sodium heat pipe, incorporated in the separator. The combustion chamber-separator in FIG. 9 is designated 150 and differs from the one in FIG. 5 in that the conical walled portion 90' thereof is formed of two spaced conical walls defining a conical space 90a in which the sodium is contained so as to form a sodium heat pipe. The channels 31'-34' extend from the engine 10 and have portions extending through sealed openings in the outer wall of the cone-shaped heat pipe to form a loop therein and to return through sealed openings to the engine. The sodium heat pipe defined by this conical space 90a indirectly transmits the heat of the burning fuel to the channels. Thus in this embodiment of the invention the solids separator serves not only as a combustion chamber but also is constructed to form the sodium heat pipe utilized for indirect heating of the channels 31'-34' for the working fluid of the engine.

It should be understood that although indirect heating of the channels for the working fluid of the engine has been shown in FIGS. 2 and 5, these channels may be heated by direct heat transfer from the burning fuel of the combustion chamber. Thus in FIG. 2, the sodium heat pipe 100 may be eliminated so that the portion of the fuel channel 31 within the combustion chamber 13 is directly exposed to the heat of the burning fuel. In FIG. 5 the sodium heat pipe 100' may be eliminated so that the working fluid channel 31' there shown including that portion helically wound about the conical portion of the combustion chamber-separator 15 is in direct surface-to-surface contact therewith so that it will be heated directly through the walls of the channel and the wall of the combustion chamber-separator without any intervening heat transfer means. Of course there would be a partial indirect heating of the channels through the encasing carbon graphite or other heat conducting material 93.

It has been shown that the several fuel chemicals identified hereinabove release differing amounts of heat when combusted, and that water may be used as an accelerator to increase the heat released. By combining one or more of these fuel chemicals, as for example, magnesium or aluminum or an alloy thereof with a hydride of magnesium or aluminum, and by varying the proportions, a fuel can be tailored to any heat release per unit of volume desired for a specific application.

It is also possible to control the heat released per unit of time, sometimes referred to as the burning rate. The relation between the surface area and the volume of a particle is critical to heat release per unit of time. Particle size of the fuel is important from this standpoint. Moreover, the energy within particles of a given size can be controlled.

If the fuel is fabricated of compressed particles into a rod or billet, several additional parameters for control are available. For example, a rod of the fuel inhibited from burning on the sides but allowed to burn on the end will conduct heat along the rod. The conduction of heat will depend not only on the chemical and thermodynamic properties of the particles, but also upon the amount of compaction, that is, overall density. These variables can be used to control the heat release per unit of time.

Flame temperature will depend on the formulation of the fuel. The greater the flame temperature, the greater the temperature will be a distance along the fuel rod of a given thermal conductivity. This interrelation will bring the material through the solid to liquid phase more rapidly and thus increase the burning rate. This applies to alloyed hydrided fuel rods and to those of other configurations.

What I claim as my invention is:

1. A system of operating an external combustion engine which is operated by a heated working fluid of the engine, comprising providing a fuel selected from the group consisting of magnesium hydride, aluminum hydride and magnesium aluminum hydride, providing a combustion chamber in association with the engine, burning said fuel in said combustion chamber, and subjecting the working fluid of the engine to the heat generated by the burning fuel in said combustion chamber.

2. A system of operating an external combustion engine which is operated by a heated working fluid of the engine, comprising providing a fuel a portion of which is selected from the group consisting of magnesium, aluminum, magnesium plus aluminum, and magnesium-aluminum alloy, and another portion of which is selected from the group consisting of magnesium hydride, aluminum hydride and magnesium aluminum hydride, providing a combustion chamber in association with the engine, burning said fuel in said combustion chamber, and subjecting the working fluid of the engine to the heat generated by the burning fuel in said combustion chamber.

3. The system defined in claim 1 or 2, including collecting the solids resulting from the burned fuel, reducing said solids and reprocessing the reduction products for reuse as, for example, a fuel of an external combustion engine.

4. The system defined in claim 1 or 2, including varying the burn rate of the fuel as required by engine demand.

5. The system defined in claim 1 or 2, including accelerating the burn rate of the fuel by slitting as required by engine demand.

6. The system defined in claim 1 or 2, including accelerating the burn rate of the fuel by adding water to the burning fuel as required by engine demand.

7. The system defined in claim 1 or 2, wherein the fuel is in the form of plural rods, and feeding one or more of such rods depending upon engine demand.

8. The system defined in claim 1 or 2, wherein the working fluid of the engine is subjected to the heat generated by the burning fuel in said combustion chamber indirectly through heat transfer means.

9. The system defined in claim 1 or 2, including controlling the heat release per unit of volume and time and the flame temperature by the selection of fuel chemicals from the group specified as well as the relative proportions thereof, and by the selection of the physical properties, condition and treatment of such fuel chemicals.

10. A system of operating an external combustion engine which is operated by a heated working fluid of the engine, comprising providing a fuel selected from the group consisting of magnesium hydride, aluminum hydride and magnesium aluminum hydride, providing an energy conversion device, feeding the fuel and air into said energy conversion device and burning the fuel therein, subjecting the working fluid of the engine to the heat generated by the burning fuel in said energy conversion device, separating the solids resulting from the burning of the fuel while in said energy conversion device and collecting the same.

11. The system defined in claim 10, wherein the working fluid of the engine is subjected to the heat generated by the burning fuel in said energy conversion device indirectly through heat transfer means.

12. The system defined in claim 10, including reducing said solids and reprocessing the reduction products for reuse as, for example, a fuel of an external combustion engine.

13. The system defined in claim 11, wherein said heat transfer means comprises a sodium heat pipe.

14. The system defined in claim 10, including varying the burn rate of the fuel as required by engine demand.

15. The system defined in claim 10, including accelerating the burn rate of the fuel by slitting as required by engine demand.

16. The system defined in claim 10, including accelerating the burn rate of the fuel by adding water to the burning fuel as required by engine demand.

17. The system defined in claim 10, wherein the fuel is in the form of plural rods, and feeding one or more of such rods depending upon engine demand.

* * * * *